United States Patent [19]

Usui et al.

[11] Patent Number: 4,948,774

[45] Date of Patent: Aug. 14, 1990

[54] METAL-MADE CARRIER BODY FOR CARRYING THEREON EXHAUST GAS CLEANING CATALYST

[75] Inventors: Masayoshi Usui; Haruo Serizawa, both of Shizuoka, Japan

[73] Assignee: Usui Kokusai Sangyo Kabushiki Kaisha, Japan

[21] Appl. No.: 376,069

[22] Filed: Jul. 6, 1989

[30] Foreign Application Priority Data

Jul. 6, 1988 [JP] Japan ................................ 63-166836

[51] Int. Cl.$^5$ ............................................. B01J 32/00
[52] U.S. Cl. ...................................... 502/439; 502/527
[58] Field of Search ................. 502/439, 527; 422/180

[56] References Cited

U.S. PATENT DOCUMENTS 4,777,158 10/1988 Cyron ................................... 502/527

FOREIGN PATENT DOCUMENTS 3726502 3/1988 Fed. Rep. of Germany ...... 502/527

OTHER PUBLICATIONS

Japanese Patent Laid-Open Publication No. 13462/1979.
Japanese Patent Laid-Open Publication No. 15585/1982.
Japanese Patent Laid-Open Publication No. 199574/1986.

*Primary Examiner*—W. J. Shine
*Attorney, Agent, or Firm*—Lowe, Price, LeBlanc, Becker & Shur

[57] ABSTRACT

A metal-made carrier body, for carrying thereon an exhaust gas cleaning catalyst, comprises a metal casing, and a multi-layered composite structure or honeycomb core structure composed of a sheet-like metal band and a corrugated metal band and enclosed in the tubular metal casing and joined therewith. The inner wall of the casing is provided with brazing-material-holding grooves. Because of the brazing-material-holding grooves, it is possible to join the honeycomb core structure and the casing together with adequate firmness, thus making the carrier body excellently durable.

13 Claims, 5 Drawing Sheets

METAL-MADE CARRIER BODY FOR CARRYING THEREON EXHAUST GAS CLEANING CATALYST

BACKGROUND OF THE INVENTION

1. Field of the Invention:

The present invention relates to a metal-made carrier body for carrying thereon an exhaust gas cleaning catalyst which is generally provided as an exhaust gas cleaning means at an intermediate point of an exhaust system of an automobile.

More particularly, the invention relates to a metal-made carrier body for carrying thereon an exhaust gas cleaning catalyst, in which the individual components of the carrier body are joined with improved strength so as to resist against peeling due to thermal strains. The invention is also concerned with a method of manufacturing such metal-made carrier body.

2. Description of the Related Art:

Conventional metal-made carrier bodies of the above sort, which are adapted to carry an exhaust gas cleaning catalyst thereon, include those having a structure formed by laminating at least one sheet-like metal band and at least one corrugated metal band in layers or rolling them together into a multi-layered composite body with a view toward increasing the carrying area per unit volume, namely, with a view toward increasing as much as possible the effective area of contact between exhaust gas and the exhaust gas cleaning catalyst per unit volume and further reducing the own weight of the metal-made carrier body to a maximum possible extent. As it is in the form of a honeycomb, this structure is hereinafter called "honeycomb core structure".

For example, a sheet-like metal band made of a heat-resistant thin metal sheet having a thickness of 0.1 mm or smaller and a corrugated band made from another thin metal sheet of the same type are superposed one over the other to have areas of contact therebetween. They are then rolled together spirally into a honeycomb core structure defining many network-patterned gas flow passages along a central axis thereof for allowing exhaust gas to pass therethrough. The honeycomb core structure is enclosed within a tubular metal casing which has a single-layer structure and opens in opposite ends thereof. The members of the honeycomb core structure, i.e., the sheet-like band and corrugated band are put together into a vibration-proof structure. Namely, the sheet-like band and corrugated band as well as the honeycomb core structure thus rolled and the metal casing are put together at the areas of contact therebetween by welding, brazing or the like. These joining means at the areas of contact between the honeycomb core structure and the metal casing are exemplified by the following:

(i) Electron beam welding, laser beam welding, arc welding, etc. as disclosed in Japanese Patent Laid-Open Publication No. 13462/1979 and Japanese Patent Laid-Open Publication No. 1585/1982, for example.

(ii) Brazing, as disclosed in Japanese Patent Laid-Open Publication No. 199574/1986. This brazing includes enclosing a honeycomb core structure in a metal casing, applying a brazing material over end portions of such a composite structure such as by painting or spraying, and heating around end portions of the composite structure.

The above conventional joining methods cause the following production and quality problems:

With the joining method of (i) above, it is necessary to use special and expensive equipments.

In the joining method of (ii) above, the applying of wax is laborious and time-consuming, and the degree of joining strength at the central portion of the areas of contact between the honeycomb core structure and the metal casing is not adequate.

Generally, the metal-made carrier body of this type is used in severe thermal environments and hence requires adequate durability against any breakage, cracking or peeling of the members making up the carrier body. In the exhaust system of an automobile, the members of the carrier body are subjected to strains (hereinafter called "thermal strains") due to the large difference between their coefficients of thermal expansion (volume expansion and linear expansion) under the severe cooling and heating cycle of from 31 20° C. to 900° C. These members are also subjected to vibrations from the automobile body. As a result, the members would be separated, cracked or otherwise damaged.

If different kinds of metal materials, i.e., austenitic stainless steel and ferritic stainless steel are used for the metal casing and the honeycomb core structure, respectively, in view of oxidation resistivity and thermal stability, the extent of separation of these two parts would be much greater because of the difference in thermal expansion between the two parts. When a small scale of separation once occurred at the areas of contact between the metal casing and the honeycomb core structure, such small separation would expand in relays. Concurrently with this separation, vibration from the automobile body is added to these two parts so that especially the contact portions between a sheet-like band and a corrugated band constituting the honeycomb core structure are subjected to peeling, cracking, breakage or other damage.

Consequently, in the metal-made carrier body of this conventional type, the inner wall surface of the metal casing and the outer peripheral surface of the honeycomb core structure must be joined to each other reliably with adequate firmness. Heretofore, there has been proposed no effective joining method.

SUMMARY OF THE INVENTION

It is therefore an object of the present invention to provide a metal-made carrier body for carrying an exhaust gas cleaning catalyst thereon, which can prevent separation of the constituent members of the carrier body from each other and cracking of the constituent members themselves, thus guaranteeing an adequate cleaning function for a long period of time.

According to the present invention, there is provided a metal-made carrier body for carrying thereon an exhaust gas cleaning catalyst, the carrier body being formed by superposing a sheet-like metal band made of a thin metal sheet and a corrugated band made from another thin metal sheet one over the other in a contiguous relation into a honeycomb core structure of a spiral or laminate form defining many network patterned gas flow passages along the central axis thereof, and then fixing the honeycomb core structure within a tubular metal casing, characterized in that the honeycomb core structure is fixed on the tubular metal casing by a brazing material held in brazing-material-holding grooves formed in the inner wall of the tubular metal casing.

The above and other advantages, features and additional objects of the present invention will become manifest to those versed in the art upon reference to the

DETAILED DESCRIPTION

As described above, the principal feature of the present invention resides in improving the joining strength between constituent members of a metal-made carrier body, especially the joining strength at the entire area of contact between the inner wall of a tubular metal casing and the peripheral surface of a honeycomb core structure.

A more specific feature of the present invention resides in providing an adequate degree of joining strength at and around the central portion of the inner wall of the tubular metal casing with the peripheral surface of the honeycomb core structure.

A variety of means for improving the joining strength between the honeycomb core structure and the tubular metal casing will now be described with reference to the accompanying drawings.

Figure 1:
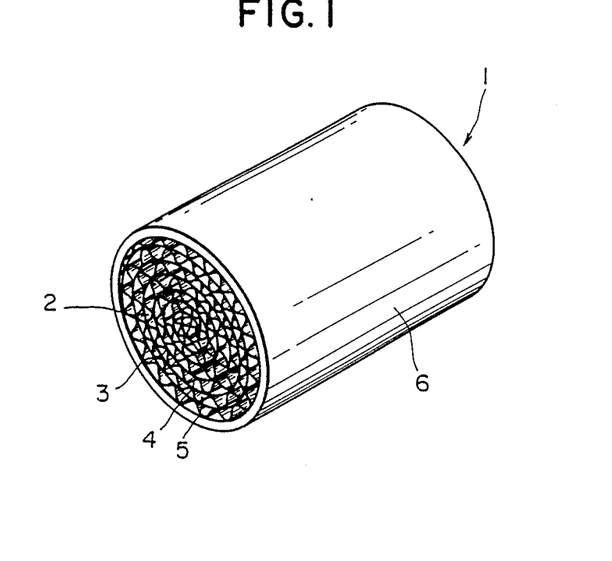
FIG. 1 is a perspective view of a rolled metal-made carrier body, for carrying thereon an exhaust gas cleaning catalyst, embodying the present invention.
Figure 2:
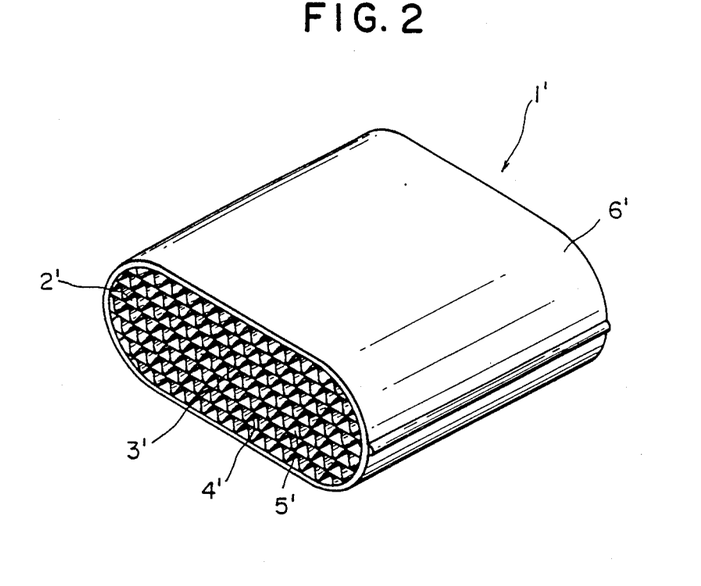
FIG. 2 is a perspective view of a laminated metal-made carrier body embodying of the invention.

FIGS. 1 and 2 are perspective views of a metal-made carrier body 1, 1', according to the present invention, for carrying thereon an exhaust gas cleaning catalyst. The metal-made carrier body 1, 1' is constructed in the following manner. A honeycomb core structure 2 of FIG. 1 is composed of a sheet-like metal band 3 and a corrugated metal band 4 rolled together into a spiral form. A honeycomb core structure 2' of FIG. 2 is composed of a sheet-like metal band 3' and a corrugated metal band 4' are are superposed one over the other. Then the honeycomb core structure 2, 2', as shown in FIGS. 1 and 2, is enclosed in a tubular metal casing 6, 6', and these constituent members are joined together in a manner described to provide the metal-made carrier body 1, 1' in a multi-layered composite form defining many network-patterned gas flow passages 5, 5' along the central axis of the carrier body 1, 1'.

In order to improve the joining strength between the honeycomb core structure 2, 2' and the tubular metal casing 6, 6', brazing-material-holding grooves 7 are formed in the entire inner wall of the tubular metal casing 6, 6', or in the central portion (excluding marginal portions contiguous to opposite open ends) of the casing 6, 6'. The brazing-material-holding grooves 7 serve to retain the brazing material.

The brazing-material-holding grooves 7 may be formed in the inner wall of the tubular metal casing 6, 6' in a variety of fashions shown in FIGS. 3 through 15. However, the present invention is not limited to these illustrated embodiments. If it is linear for example, the individual recess 7 may have a width of 0.2 to 1.0 mm and a depth of 0.2 to 0.5 mm, which are sufficient to achieve an improved degree of joining strength. The size of the recess 7 is not limited to these particular figures. In the present invention, the brazing-material-holding grooves 7 may be formed by milling, pressing (plastic deformation), or the like.

Figure 3:
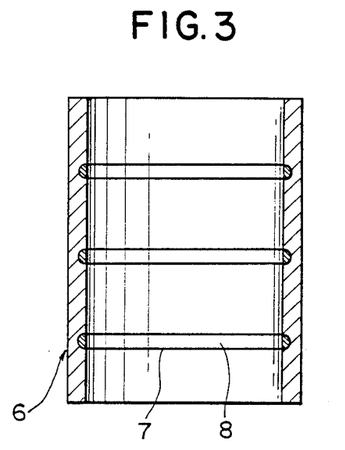
FIG. 3 is a longitudinal cross-sectional view of a metal casing in which brazing-material-holding grooves, fine recesses are formed according to a first embodiment of the invention.

FIG. 3 is a longitudinal cross-sectional view of a tubular metal casing 6 in which the brazing-material-holding grooves 7 are formed in its inner wall in lines perpendicular to the central axis of the casing 6 and spaced at desired intervals according to a first embodiment of the invention. Wire rods 8 of the brazing material are held one in each of the brazing-material-holding grooves 7.

Figure 4:
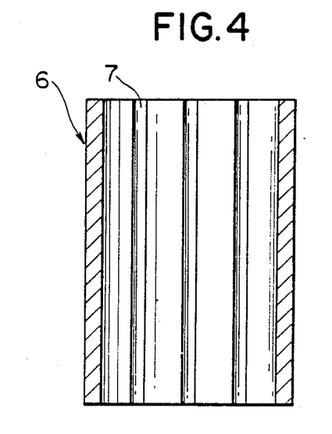
FIG. 4 is a longitudinal cross-sectional view of a metal casing in which brazing-material-holding grooves are formed according to a second embodiment of the invention.
Figure 5:
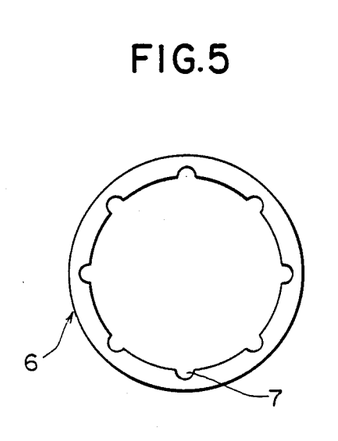
FIG. 5 is a plan view of FIG. 4.

FIG. 4 is a longitudinal cross-sectional view of a tubular metal casing 6 in which the brazing-material-holding grooves 7 according to a second embodiment of the invention. FIG. 5 is a plan view of the tubular metal casing 6 of FIG. 4.

As shown in FIGS. 4 and 5, the brazing-material-holding grooves 7 are formed in the inner wall of the tubular metal casing 6 in lines extending parallel to the central axis of the tubular metal casing 6 along its entire length and spaced at desired intervals.

Figure 6:
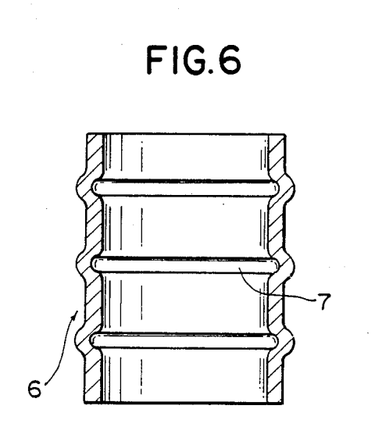
FIG. 6 is a longitudinal cross-sectional view of a metal casing in which brazing-material-holding grooves according to a third embodiment of the invention.

FIG. 6 is a longitudinal cross-sectional view of a tubular metal casing 6 in which the brazing-material-holding grooves 7 are formed according to a third embodiment of the invention.

As shown in FIG. 6, the brazing-material-holding grooves 7 are in the form of recesses formed on the inner wall of the tubular metal casing 6 by plastic deformation, namely, pressing.

Figure 7:
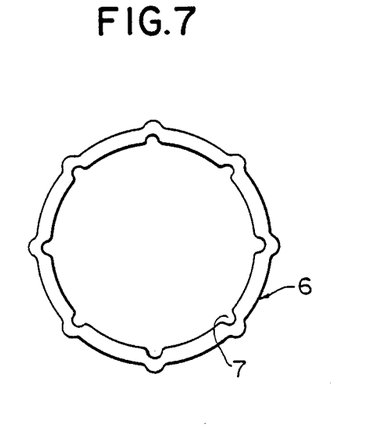
FIG. 7 is a plan view of a metal casing in which brazing-material-holding grooves are formed according to a fourth embodiment of the invention.

FIG. 7 is a plan view of the tubular metal casing 6 in which the brazing-material-holding grooves 7 are formed according to a fourth embodiment of the invention. The brazing-material-holding grooves 7 of FIG. 7 are a modification of those of FIGS. 4 and 5, and extend in the direction of the central axis of the tubular metal casing 6 along its entire length.

Figure 8:
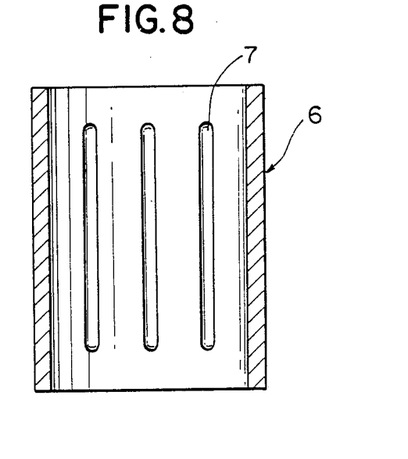
FIG. 8 is a longitudinal cross-sectional view of a metal casing in which brazing-material-holding grooves are formed according to a fifth embodiment of the invention.
Figure 9:
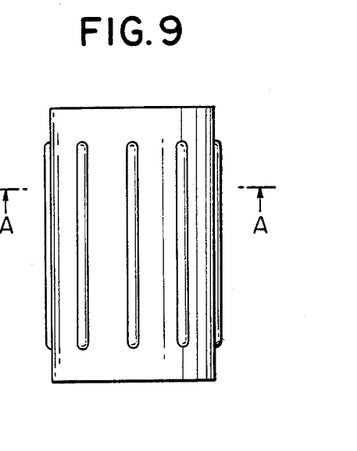
FIG. 9 is a front elevational view of FIG. 8.
Figure 10:
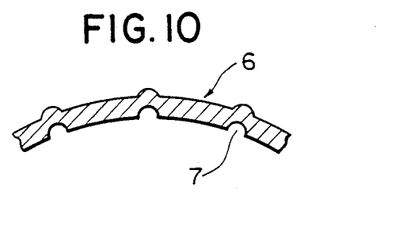
FIG. 10 is a fragmentary cross-sectional view taken along line A—A of FIG. 9.
Figure 11:
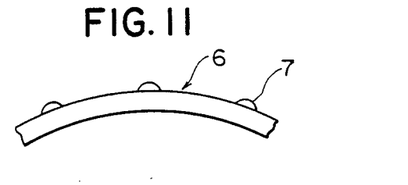
FIG. 11 is a fragmentary plan view of FIG. 9.

FIGS. 8 through 11 illustrate a tubular metal casing in which the brazing-material-holding grooves 7; FIG. 8 is a longitudinal cross-sectional view of the casing 6, FIG. 9 is a front elevational view of the casing 6, FIG. 10 is a transverse cross-sectional view taken along line A—A of FIG. 9, and FIG. 11 is a plan view of the casing 6. In the casing 6 of FIGS. 8 through 11, unlike that of FIGS. 4 and 5, the brazing-material-holding grooves 7 are disposed only at the central portion, terminating short of the opposite open ends of the casing 6. With these brazing-material-holding grooves 7, after the tubular casing 6 and the honeycomb core structure 2 have been brazed together, the molten brazing material is prevented from flowing out of the metal-made carrier body 1, thus guaranteeing an improved degree of joining strength for a long period of time.

Figure 12:
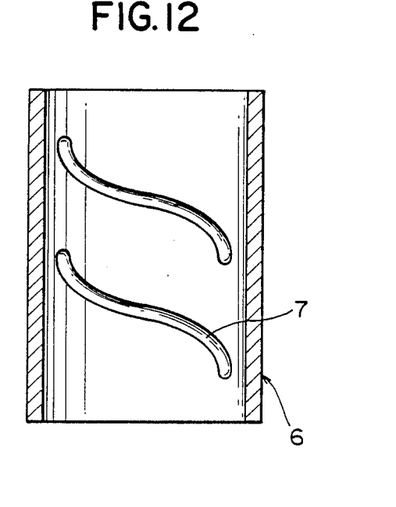
FIG. 12 is a longitudinal cross-sectional view of a metal casing in which brazing-material-holding grooves are formed according to a sixth embodiment of the invention.

FIG. 12 is a longitudinal cross-sectional view of a tubular metal casing 6 in which the brazing-material-holding grooves 7 are formed according to a sixth embodiment of the invention. In this embodiment, the brazing-material-holding grooves 7 are formed in discrete curved lines extending at a desired angle with respect to the central axis of the tubular metal casing 6.

Figure 13:
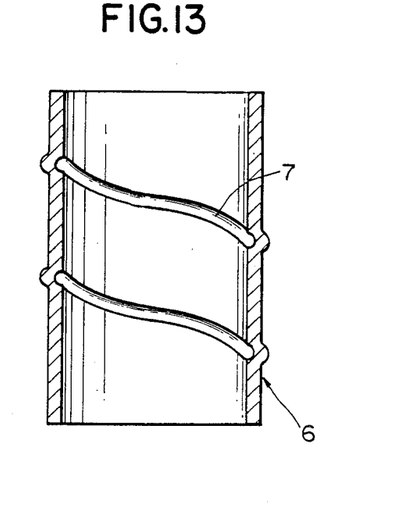
FIG. 13 is a longitudinal cross-sectional view of a metal casing in which brazing-material-holding grooves are formed according to a seventh embodiment of the invention.

FIG. 13 is a longitudinal cross-sectional view of a tubular metal casing 6 in which the brazing-material-holding grooves 7 are formed according to a seventh embodiment of the invention. In this embodiment, the brazing-material-holding grooves 7 are formed in continuous curved lines extending at a desired angle with respect to the central axis of the tubular metal casing 6.

Figure 14:
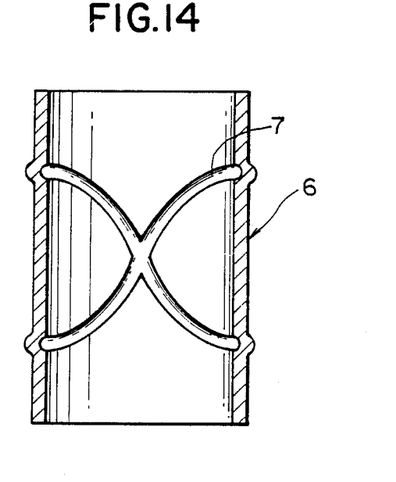
FIG. 14 is a longitudinal cross-sectional view of a metal casing in which brazing-material-holding grooves are formed according to an eighth embodiment of the invention.

FIG. 14 is a longitudinal cross-sectional view of a tubular metal casing 6 in which the brazing-material-holding grooves 7 are formed according to an eighth embodiment of the invention. In this embodiment, the brazing-material-holding grooves 7 are formed in intersecting curved lines.

Figure 15:
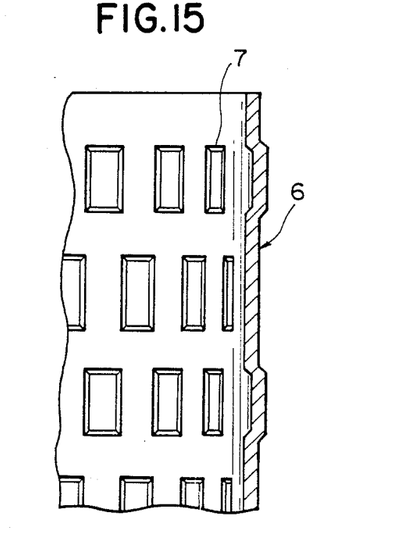
FIG. 15 is a fragmentary longitudinal cross-sectional view of a metal casing in which brazing-material-holding grooves are formed according to a ninth embodiment of the invention.

FIG. 15 is a longitudinal cross-sectional view of a tubular metal casing 6 in which the brazing-material-holding grooves 7 according to a ninth embodiment of the invention. The brazing-material-holding grooves 7 of FIG. 15 are formed in blocks.

in the manufacture of the metal-made carrier body for carrying thereon an exhaust gas cleaning catalyst, as described above, the brazing-material-holding grooves 7 formed in the inner wall of the tubular metal casing 6 are filled with wire rods 8 of the brazing material, for example, as shown in FIG. 3. Alternatively, a molten brazing material may be solidified by cooling in the brazing-material-holding grooves 7. In another alternative form, a paste containing the brazing material may be solidified by drying in the brazing-material-holding grooves 7. The brazing material to be used in the present invention is preferably a high-temperature brazing material such as Ni in view of the conditions of use of this kind of metal-made carrier body.

Then, the honeycomb core structure 2 is enclosed in the tubular metal casing 6 to provide a multi-layered composite body, whereupon the composite body is heated at a temperature of at least the melting point of the brazing material. As a result, the tubular metal casing 6 and the honeycomb core structure 2 are joined together with adequate firmness by the brazing material. Thus, according to the present invention, it is possible to join together these two members especially at the central portion of the tubular metal casing 6 reliably with improved firmness.

in the present invention, the sheet-like metal band 3, 3' and the corrugated metal band 4, 4', which constitute the honeycomb core structure 2, 2', are joined together at the contact portions (the sheet-like band is in contact with the ridges or valleys of the corrugated band) by a known means. For example, the honeycomb core structure 2 constituted by rolling the sheet-like metal band 3 and the corrugated metal band 4 together into a spiral form is enclosed in the tubular metal casing 6 in which the wire rods of brazing material are held in the brazing-material-holding grooves 7. Then the brazing material is applied to the opposite open ends of the tubular metal casing 6 by painting or spraying, and excessive brazing material is removed, whereupon the resulting multi-layered composite body is subjected to heat-treatment. As a result, the constituent members (the sheet-like metal band and the corrugated metal band) of the honeycomb core structure 2 can be joined concurrently with the joining between the peripheral surface of the honeycomb core structure 7 and the metal casing 6, thus causing an improved rate of production. In this case, it is preferred to use the tubular metal casing 6 in which the fine recesses 7 are formed on the inner wall of the tubular metal casing 6 at portions except the marginal portions contiguous to the opposite open ends of the casing 6.

Alternatively, in production of the honeycomb core structure 2, a corrugated metal band in which the brazing material is already applied to longitudinal ridges and/or valleys may be used. In this case, the resulting honeycomb core structure 2 is forcedly enclosed in the tubular metal casing 6 holding the wire rods of brazing material, whereupon heat treatment is performed.

With the metal-made carrier body constructed as mentioned above, since the honeycomb core structure and the tubular metal casing are brazed together by heat-treatment after the honeycomb core structure is enclosed in the tubular metal casing in which the brazing material is already held in the brazing-material-holding grooves formed in the inner wall of the tubular metal casing, it is possible to achieve the following advantageous results:

(i) The inner wall of the metal casing and the peripheral surface of the honeycomb core structure can be joined together at their areas of contact, especially centrally thereof with markably improved firmness, thus making the metal-made carrier body excellently durable.

(ii) Since the brazing material in the form of wire rods is held in the brazing-material-holding grooves before brazing, uniform and reliable brazing operation can be achieved.

(iii) It is possible to control the amount of use of a brazing material; in general, an expensive high-temperature brazing material such as Ni is used for production of a metal-made carrier body.

(iv) It is possible to omit the drying step and hence to obtain an improved rate of production, compared with the conventional art in which the brazing material is painted or penetrates.

The present invention will now be described in detail by the following example. It should be noted that the present invention is not limited to this illustrated (i) Production of honeycomb core structure:

A heat-resistant thin steel band made of ferritic stainless steel (Cr content: 20%, A; content: 5%) and having a thickness of 0.04 mm and a width of 74.5 mm was used as a sheet-like metal band.

The sheet-like metal band was fed between forming gears to obtain a corrugated metal band in a wavy shape with longitudinal ridges spaced at pitches of 2.5 mm.

Then the sheet-like band and the corrugated band were superposed one over the other to define areas of contact therebetween, whereupon these two bands were rolled together into a spiral form and were spot-welded at desired locations. As a result, a honeycomb core structure having an outer diameter of 70 mm and defining many network-patterned gas flow passages along a central axis thereof was formed.

(ii) Production of metal casing:

Brazing-material-holding grooves each having a width of 1 mm and a depth of 0.5 mm were formed on a sheet of austenitic stainless steel (SUS 304) by milling. A tubular metal casing having an inside diameter of 70 mm, a thickness of 1.2 mm and a length of 80 mm was produced from the resulting steel sheet, with six brazing-material-holding grooves located about the central portion in the inner wall of the casing.

(iii) Production of metal-made carrier body:

Wire rods of brazing material (nickel) having a diameter of 0.4 mm were fitted in the brazing-material-holding grooves in the inner wall of the metal casing. The honeycomb core structure was forcedly enclosed in the metal casing, whereupon the metal casing and the honeycomb core structure were brazed together by heating them in vacuum at a temperature of at least the melting point of the brazing material. As a result, a metal-made carrier body with the metal casing and the honeycomb core structure free from separation for a long period of time was obtained.

What is claimed is:

1. A metal-made carrier body for carrying thereon an exhaust gas cleaning catalyst, said carrier body being formed by superposing a sheet-like metal band made of a thin metal sheet and a corrugated band made from another thin metal sheet one over the other in a contiguous relation into a honeycomb core structure of a spiral or laminate form defining many network-patterned gas flow passages along the central axis thereof, and then fixing the honeycomb core structure within a tubular metal casing, characterized in that the honeycomb core body is fixed on the tubular metal casing by a brazing material held in brazing-material-holding grooves formed in the inner wall of the tubular metal casing.

2. A metal-made carrier body according to claim 1, wherein the brazing-material-holding grooves are formed in straight or curved lines, or in blocks.

3. A metal-made carrier body according to claim 1, wherein the brazing-material-holding grooves are formed in lines extending at a desired angle with respect to the central axis of the tubular metal casing.

4. A metal-made carrier body according to claim 1, wherein the brazing-material-holding grooves are formed in the inner wall of the tubular metal casing in lines parallel to the central axis of the tubular metal casing and spaced at desired intervals.

5. A metal-made carrier body according to claim 1, wherein the brazing-material-holding grooves are formed in the inner wall of the tubular metal casing in lines perpendicular to the central axis of the tubular metal casing and spaced at desired intervals.

6. A metal-made carrier body according to claim 1, wherein the brazing-material-holding grooves are formed in the inner wall of the tubular metal casing along the entire axial length of the tubular metal casing.

7. A metal-made carrier body according to claim 1, wherein the brazing-material-holding grooves are formed in the inner wall of the tubular metal casing along part of the axial length of the tubular metal casing.

8. A metal-made carrier body according to claim 1, wherein the brazing-material-holding grooves are recesses formed on the inner wall of the tubular metal casing.

9. A metal-made carrier body according to claim 1, wherein the brazing-material-holding grooves are recesses formed on the inner wall of the tubular metal casing by pressing.

10. A metal-made carrier body according to claim 1, wherein the brazing material held in the individual brazing-material-holding groove is in the form of a wire rod.

11. A metal-made carrier body according to claim 1, wherein the brazing material held in the individual brazing-material-holding groove is in the form of a block.

12. A metal-made carrier body according to claim 1, wherein the brazing material held in the individual brazing-material-holding groove is a brazing material which has been put in the groove in a molten state and then solidified in the groove by cooling.

13. A metal-made carrier body according to claim 1, wherein the brazing material held in the brazing-material-holding grooves is a brazing material which has been put in the grooves in a paste state and then dried in the grooves.

* * * * *

UNITED STATES PATENT AND TRADEMARK OFFICE
CERTIFICATE OF CORRECTION

PATENT NO. : 4,948,774

DATED : August 14, 1990

INVENTOR(S) : Masayoshi USUI et al

It is certified that error appears in the above-identified patent and that said Letters Patent is hereby corrected as shown below: The following Figures 1, 2, 3, 4, 5, 6, 7, 8, 9, 10, 11, 12, 13, 14 and 15 were omitted from the original Deed of Letters Patent No. 4,948,774:

FIG. 1

UNITED STATES PATENT AND TRADEMARK OFFICE
CERTIFICATE OF CORRECTION

PATENT NO. : 4,948,774

DATED : August 14, 1990

INVENTOR(S) : Masayoshi USUI et al

It is certified that error appears in the above-identified patent and that said Letters Patent is hereby corrected as shown below:

FIG. 2

UNITED STATES PATENT AND TRADEMARK OFFICE
CERTIFICATE OF CORRECTION

PATENT NO. : 4,948,774

DATED : August 14, 1990

INVENTOR(S) : Masayoshi USUI et al

It is certified that error appears in the above-identified patent and that said Letters Patent is hereby corrected as shown below:

UNITED STATES PATENT AND TRADEMARK OFFICE
CERTIFICATE OF CORRECTION

PATENT NO. : 4,948,774

DATED : August 14, 1990

INVENTOR(S) : Masayoshi USUI et al

It is certified that error appears in the above-identified patent and that said Letters Patent is hereby corrected as shown below:

UNITED STATES PATENT AND TRADEMARK OFFICE
CERTIFICATE OF CORRECTION

PATENT NO. : 4,948,774  Page 5 of 6

DATED : August 14, 1990

INVENTOR(S) : Masayoshi Usui et al

It is certified that error appears in the above-identified patent and that said Letters Patent is hereby corrected as shown below:

FIG.12

FIG.13

UNITED STATES PATENT AND TRADEMARK OFFICE
CERTIFICATE OF CORRECTION

PATENT NO. : 4,984,774

DATED : August 14, 1990

INVENTOR(S) : Masayoshi Usui et al

It is certified that error appears in the above-identified patent and that said Letters Patent is hereby corrected as shown below:

FIG.14

FIG.15

Signed and Sealed this

First Day of December, 1992

Attest:

DOUGLAS B. COMER

Attesting Officer

Acting Commissioner of Patents and Trademarks